June 24, 1930. J. F. J. BETHENOD ET AL 1,767,648
GEAR MECHANISM FOR DRIVING TRAIN LIGHTING GENERATORS
Filed Sept. 17, 1926
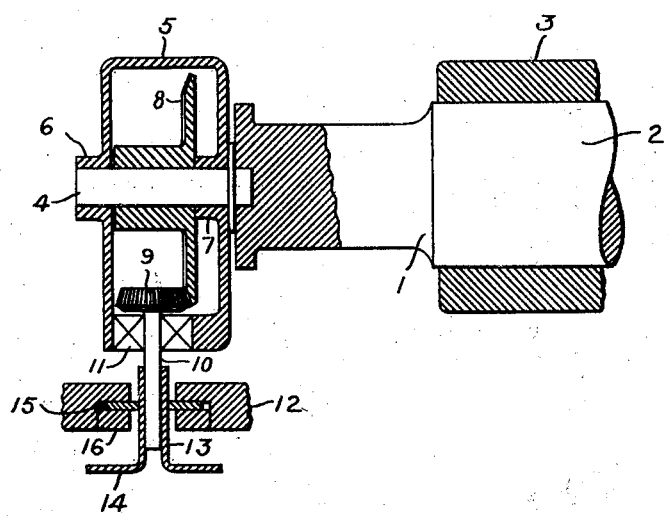
INVENTORS
Joseph Frédéric Julien Bethenod &
Achille Jonet
BY
ATTORNEY Patented June 24, 1930

1,767,648

UNITED STATES PATENT OFFICE

JOSEPH FRÉDÉRIC JULIEN BETHENOD AND ACHILLE JONET, OF PARIS, FRANCE

GEAR MECHANISM FOR DRIVING TRAIN-LIGHTING GENERATORS

Application filed Septebmer 17, 1926, Serial No. 136,032, and in France September 18, 1925.

Train-lighting generators have been driven by means of bevel-gearing in which the toothed wheels were located on the ends of the car axles and the pinions were connected to the generator shafts by means of cardan transmissions or the like.

It has been found that the operation of such mechanism cannot be satisfactory, when no consideration is given to such working conditions as the wearing of the journal, lateral play of the axle, variable clearance between the axle box and the axle guard and the like.

According to the present invention, in order to adapt the said mechanism to the above mentioned conditions, the whole bevel gear is disposed in a box which is supported, by means of bearings, by an auxiliary shaft attached to the extremity of the axle, so that a correct gearing is secured.

Our invention will be more clearly understood by reference to the accompanying drawing, the single figure of which is a view, mainly in section, of a structure embodying our invention.

In the drawing, 1 is the journal end of an axle 2 and 3 is the wheel boss. For the sake of clearness, the journal bearing itself is not shown. To the end of the axle-journal 1 is attached an auxiliary shaft 4 which supports a box or casing 5 by means of bearings 6 and 7.

It is assumed that the drawing shows the box 5 in horizontal section in a plane that lies in the axes of the axle 2 and the shaft 4.

In the box 5 is located bevel gearing which is composed of a toothed wheel 8 and a pinion 9; the wheel 8, shown in section, is keyed on the shaft 4, while the pinion 9 is carried by a shaft 10, which projects beyond the box 5 through a bearing 11 (which is preferably a ball bearing). The shaft 10 is connected to the generator axle by means of an universal (cardan) transmission, or a flexible shaft, or the like. The structure just described ensures a correct meshing of the gears 8 and 9 even though relative displacement of the axle 2 and the axle-box may occur.

Moreover, the box 5 will be preferably enclosed in the axle-box, the wall of which is partially drawn at 12, the object of this arrangement being a complete protection of the whole mechanism.

Of course, a suitable device must be provided, in order to prevent rotation of the box 5, under the action of the torque exerted by the pinion 9. As displacement of the box 5, with respect to the axle-box, is generally very small, this device may be, for example, a shoulder attached to the box 5 and playing between two lips provided on the wall of the axle-box.

Chiefly, when the generator is fixed to the side of the bogie itself, to which the axle 2 belongs, it is beneficial to adopt a transmission of the so-called double flector type (consisting, for example, of leather discs) in order to connect the shaft 10 to the axle of the generator. In this case, the shaft 10 may be surrounded by a tube 13, which can slide axially, a key or collar, or the like, insuring the transmission of the torque to a disc 14 which is fastened to the tube 13 and constitutes one of the members of the first flector. In this manner, whatever displacement of the axle 2, with respect to the frame of the generator, may occur, a correct mesh of the gears will be insured.

In order to prevent any loss of lubricant, through the hole made in the wall 12, a leather washer 15 (or the like), surrounding the tube 13, and sliding in an annular groove, may be used, with a sufficient clearance between the external periphery of the washer and the cylindrical wall of the groove.

A cover 16 may be provided, in order to permit an easy dismantling and replacing of the washer 15.

It will be clear from the foregoing description that many different embodiments of the invention may be employed; for example, a second bearing may be added in order to prevent the overhang of the pinion 9. Reciprocally, the box 5 may be supported by means of a single bearing, if the rubbing area of this bearing is chosen sufficiently large, to insure the accurate centering of the box 5, etc.

We claim as our invention:

Means for driving a train-lighting generator comprising, in combination, a car axle-box, a gear box enclosed within said axle box, an auxiliary shaft rigidly attached to the extremity of the car axle, said gear box being mounted on said shaft and supported thereon by means of end bearings, a bevel gear wheel rigidly mounted on said shaft within said gear box, a driven shaft, a bevel pinion in mesh with the said gear wheel and carried by the driven shaft, means for connecting the said driven shaft to the shaft of the generator, and means for preventing the loss of lubricant through the clearance provided between the driven shaft and the wall of the axle-box.

In testimony whereof we affix our signatures.

JOSEPH FRÉDÉRIC JULIEN BETHENOD.
ACHILLE JONET.